May 12, 1959   F. F. AHRENS, JR   2,886,268
OUTRIGGER BRACKET FOR FISHING BOATS
Filed Jan. 18, 1956   2 Sheets-Sheet 1
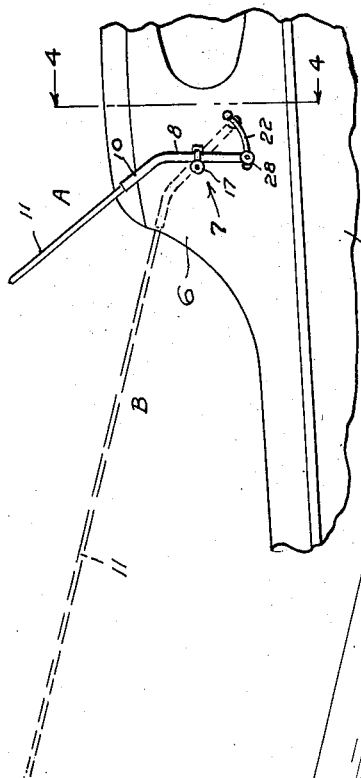
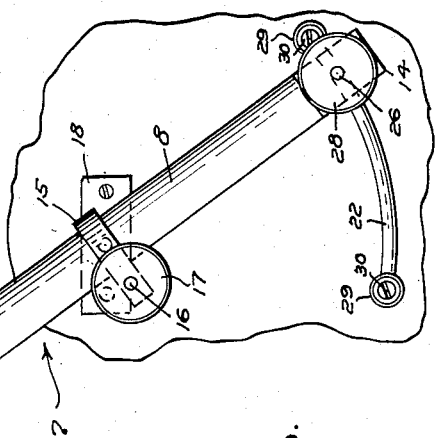
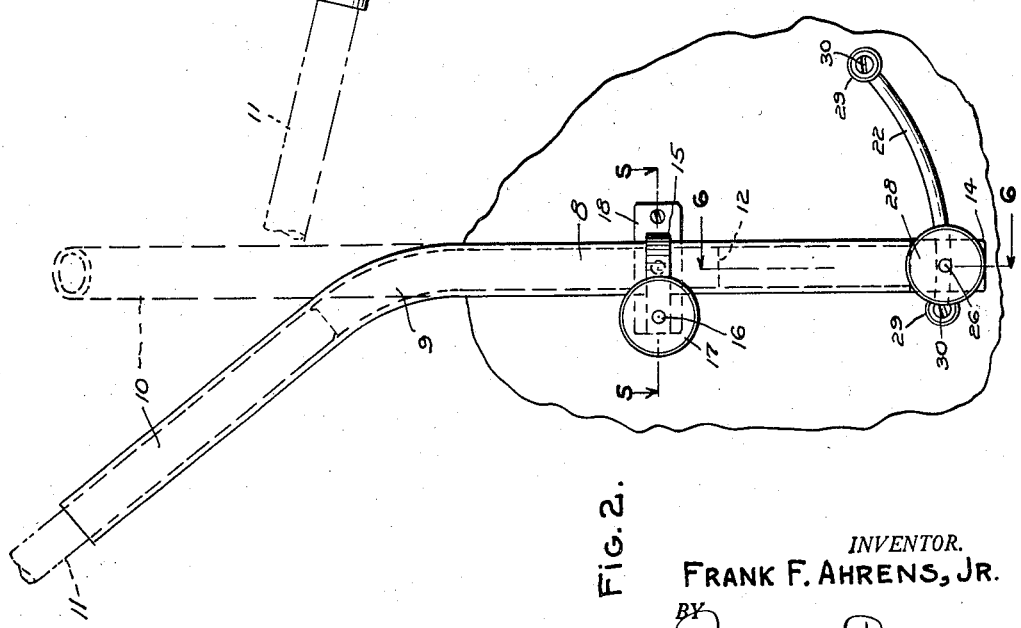
INVENTOR.
FRANK F. AHRENS, JR.
BY
ATTORNEY

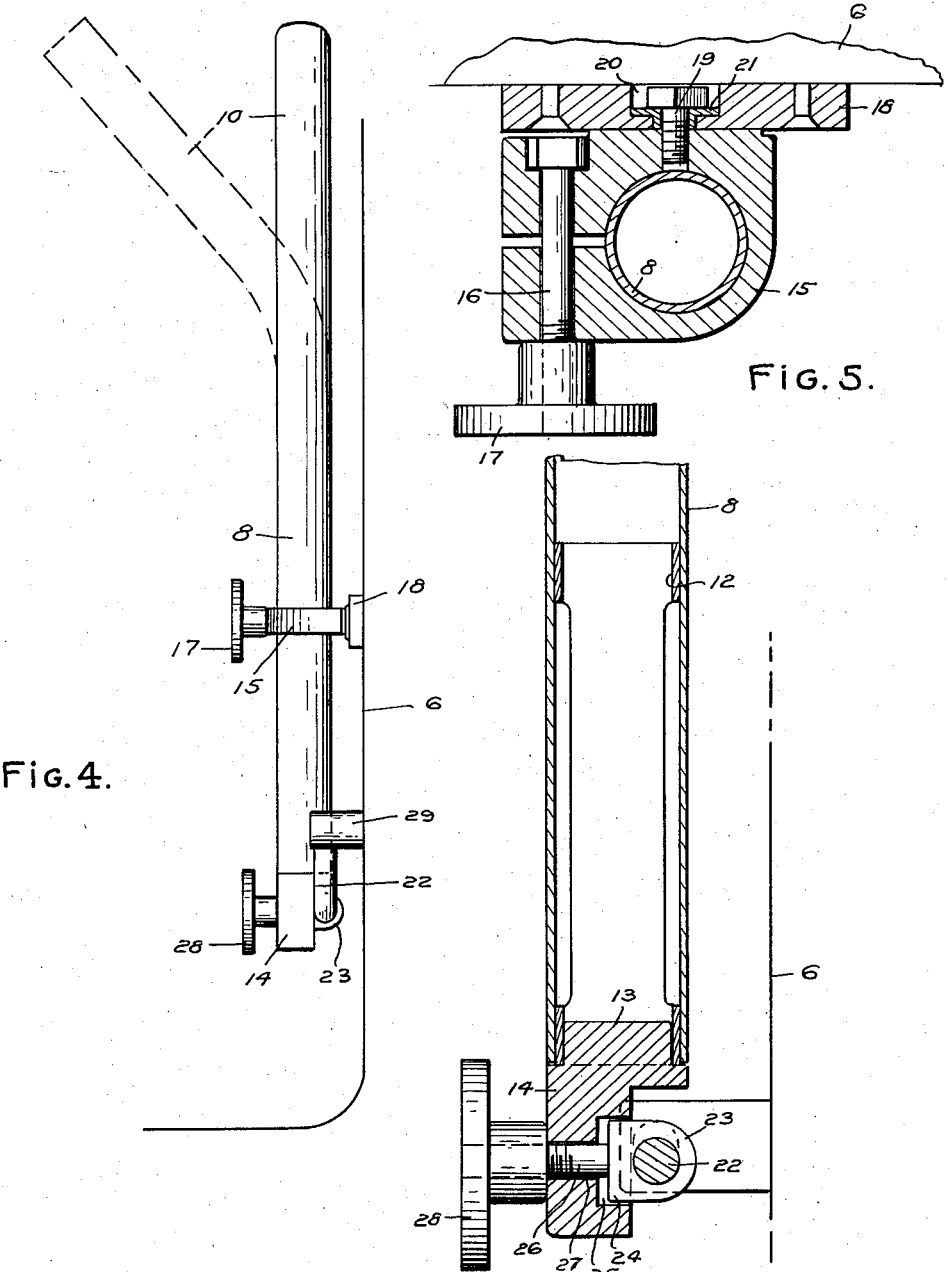

United States Patent Office 2,886,268
Patented May 12, 1959

2,886,268

OUTRIGGER BRACKET FOR FISHING BOATS

Frank F. Ahrens, Jr., West Palm Beach, Fla.

Application January 18, 1956, Serial No. 559,970

2 Claims. (Cl. 248—42)

This invention relates to a fishing outrigger bracket, which is a device used in connection with fishing boats, generally in deep sea fishing. It is separate and apart from the rod used by a fisherman on the boat, but functions to keep the fisherman's line, when he has no fish on the line, far enough out from the side of the boat that the line does not trail in the wake of the boat. To keep the line thus out from the boat generally requires the use of a long and somewhat heavy pole, usually of bamboo and called a trolling pole, which extends outwardly from the side of the boat and which has a clip at the end of said pole to which the line extends from the fisherman's rod and which temporarily holds the line until a fish takes the bait or lure on the end of the line and jerks the line free from said clip. From that moment on the fisherman on the boat has control of the line through his rod and reel. More particularly the term "fishing outrigger" relates to apparatus secured to the boat for holding or carrying the aforesaid trolling pole.

Arrangements heretofore used for such trolling poles have been attended with several disadvantages and handicaps. One practice has been to secure the pole in a fixed or rigid position whereby it extends outwardly from side of the boat more or less in a plane at right angle to the longitudinal axis of the boat, such as by having the butt of the pole secured in some manner on or near the deck of the boat and then clamping the pole at the point where it extends over the boat's gunwale. Another practice has been to hinge a carrier for the pole to some part of the boat so that it and the pole it carries can swing outwardly away from the side of the boat. Resort has also been had to apparatus including a ball joint at the butt of the pole carrier. Most, if not all, of such arrangements create the problem, when the boat goes under a bridge or otherwise passes near an object of some height above the water, of having to take the pole down and lay it on the deck alongside the cabin to afford clearance while the boat is passing the said object. And invariably they have been awkward and unhandy to operate, requiring a considerable amount of manipulation which in turn required the person who operated the device to be on the deck of the boat in the vicinity of the device in order to manipulate it. In time of rainy or stormy weather this often proves to be a great disadvantage.

It is an object of this invention to provide an adjustable fishing outrigger whereby the trolling pole, upon being placed in normal position for holding the fishing line clear of the wake of the boat, can be readily moved so as to clear an object the boat may be passing without having to take the pole down from its supporting apparatus.

It is another object of the invention to provide a fishing outrigger whereby the trolling pole can be easily and readily moved from its normal working position to a position alongside the cabin of the boat in rainy or stormy weather by an operator without having to go out upon the boat's deck to effect said adjustment.

These and other objects and advantages of my invention will be seen from the following description and from the attached drawings which illustrate a preferred form of the invention, and in which drawings Figure 1 is a fragmentary side elevation of a fishing boat showing the invention applied thereto, Figure 2 is an enlarged side elevation of the outrigger bracket shifted to the uppermost position, Figure 3 is a view similar to Figure 2 but with the bracket shifted to a lowered position, Figure 4 is a fragmentary section taken substantially on line 4—4 of Figure 1, Figure 5 is a horizontal section taken on line 5—5 of Figure 2 and, Figure 6 is a fragmentary vertical section taken substantially on line 6—6 of Figure 2.

Referring specifically to the drawings, the numeral 5 designates a conventional boat having a cabin portion 6. Preferably secured to the side of the cabin 6 and usually upon opposite sides thereof is an outrigger bracket, indicated as a whole by the numeral 7. The bracket 7 comprises a tubular socket 8 bent intermediate its ends as at 9 to form an angular extension 10. The socket 8 is open throughout its length. The extension 10 constitutes a socket for the outrigger pole 11, usually formed of bamboo or other relatively flexible material and with the pole being of recognized length employed by fishing craft and having sufficient tension to maintain a fishing line in trolling position outwardly from the side of the boat. The pole 11 forms no part of the present invention and is in common practice throughout the fishing areas.

The tubular socket 8 at its lower end is axially rotatably supported upon a tubular sleeve 12. The sleeve 12 is rigidly connected upon a cylindrical extension 13 carried by an L-shaped block 14. The socket 8 is further axially rotatably supported within a split clamp 15. The clamp 15 has clamping engagement with the socket 8 through the medium of a threaded non-rotatable bolt 16 that extends through the split portion of the clamp for engagement with a clamping nut 17. The clamp 15 is rotatably supported upon a mounting plate 18 through the medium of a stud bolt 19 that has seating engagement within an aperture 20 of the plate. A friction collar 21 serves to absorb the major wear between the parts. The plate 18 is bolted or otherwise secured to the side of the cabin 6 in a convenient position where an operator may stand within the cockpit of the boat and conveniently manipulate the nut 17.

The block 14 has over-riding engagement with an arcuate cylindrical bar 22 and the block 14 is guided with respect to the bar 22 by an apertured clamping ring 23 having a head portion 24 that is shiftable into a recess 25 formed upon the inner face of the block 14. The head portion 24 carries a threaded bolt extension 26 that passes through an aperture 27 formed in the block 14 and has threaded engagement with a clamping nut 28. The recess 25 is of such depth that upon operation of the clamping nut 28, the ring 23 will securely clamp the arcuate bar 22 against the inner face of the block portion 14 thus securely locking the socket 8 in various degrees of vertical angularity. The rod 22 at its opposite ends has rigid connection with cylindrical posts 29 that are axially apertured for the passage of fastening screws or bolts 30. The bolts or screws 30 likewise extend into or through the walls of the cabin 6. The bar 22 constitutes the limit means for the vertical swinging movement of the socket 8 and the bar 22 is on an arc that is concentric to the pivotal stud 19 of the clamping bracket 15. Thus, with the clamping nut 28 in a release position, the socket 8 may be swung downwardly from the position A in Figure 1 to the position B in Figure 1. The position A constitutes the operative position when the device is to function as a support for the outrigger pole 11 and in the position B, the bracket has been adjusted to lower the pole 11 to clear the device when passing beneath relatively low bridges or like obstructions.

Since the device is operative to maintain the pole 11 in a position outwardly from the side of the craft, it is apparent that the socket after being elevated to the position A, must be axially rotated to direct the angular extension 10 to a position laterally or at a right angle to the side of the boat. After the socket has been swung to the vertical position A, the operator then releases the clamping nut 17 and bodily rotates the socket 8 axially to the desired angle where the pole 11 will be extended outwardly away from the boat after which, the nut 17 is securely clamped with respect to the clamp 15 for holding the socket in the desired position for trolling. With the device being in the position A and then axially rotated, it will be apparent that both clamping nuts 17 and 28 are turned to clamping position. The elongated bearing sleeve 12 forms a very desirable rotatable assembly with respect to the block 14. The vertical angularity of the device may be varied by the use of a longer arcuate bar 22. However, it has been found that the lowered position of the pole 11 as in Figure 1, is adequate for all normal purposes.

In use, with the bracket and its supported pole in the uppermost normal position of operation, the attendant of the boat first rigs the line from the fisherman's reel to a suitable clip device and this clip and the line are hoisted to the terminal end of the pole 11 and, with the bracket axially rotated whereby the pole is angled outward from the boat, the line and its baited end will trail rearwardly of the boat and normally out of the wake of the boat while trolling and, with two fishermen seated in the stern of the boat, their respective lines will be trolling in a widely spaced apart position with little likelihood of becoming tangled should one or the other obtain a strike upon the bait. The bracket and its supported pole thus maintain its uppermost and outwardly angled position throughout its major use. It will be apparent that the bracket may be rotated upon its axis in order to dispose the angle end over the deck of the boat during the time that the line is hoisted to the upper end in the clip device, thus facilitating this operation. When the boat is approaching a bridge or relatively low obstruction, the bracket is shifted downwardly to a position where it substantially overlies the marginal or deck area of the boat and, should the boat be passing closely adjacent a sea wall, piling or other low obstructions while passing beneath an overhead bridge, the socket will be rotated upon its axis to cause the pole to lie wholly within the area of the boat deck. It is contemplated of course that the device shall be formed of metal that is highly resistent to corrosion or rusting.

It will be apparent from the foregoing that an extremely simple and most effective outrigger bracket has been provided. The parts are few and simple, are strong, durable and provide a bracket capable of being operated from within the cockpit of the boat and the simplicity of operation enables the fisherman to quickly and easily raise or lower the trolling pole with a minimum of effort.

It is to be understood that the invention is not limited to the precise arrangement shown, but that changes are contemplated as readily fall within the spirit of the invention as shall be determined by the scope of the subjoined claims.

Having described my invention, what I claim as new and desire to secure by Letters Patent is:

1. In combination with a boat, an outrigger device for supporting a trolling fishing rod in various degrees of angularity with respect to the boat structure, comprising a tubular socket member open at both ends, one end adapted to support the fishing rod, a tubular bearing sleeve extending into the other end of the socket member and rotatably supporting the socket member, a mounting plate supported on the boat structure, a clamp pivotally supported on the mounting plate, said clamp engaging and rotatably supporting the tubular socket, a supporting block for the bearing sleeve, an arcuate guide rod having its ends fixedly supported on the boat structure, said guide rod extending through and slidably supporting the block, means on the block for releasably securing the block at selected positions on the arcuate rod, whereby the tubular socket and the fishing rod therein may be swung in a vertical plane or rotated in a lateral direction within the supporting clamp and at varying degrees of angularity.

2. In combination with a boat, an outrigger device for supporting a trolling fishing rod in various degrees of angularity with respect to a boat structure, comprising a tubular elongated socket member that is open at both ends, one end being adapted to have the fishing rod received therein, the socket member being bent intermediate its ends and whereby to support the fishing rod at an angle with relation to the socket member, a plate fixed to the boat structure, a clamp pivotally supported on the plate, said clamp surrounding the socket member and supporting it, means for adjusting the clamp to permit rotation of the socket member therein, a tubular bearing sleeve extending into the other end of the socket member and supporting the socket member, a block to which the bearing sleeve is secured, an arcuate guide rod having its ends fixed to the boat structure, the said rod having a guiding connection with the said block, a clamping screw in the block for securing the block at adjusted positions with respect to the arcuate rod, whereby the bearing sleeve together with the socket member on the rod may be swung about the pivotal point of the clamp to position the socket on the rod at varying degrees of angularity with respect to the boat structure both longitudinally and laterally.

References Cited in the file of this patent

UNITED STATES PATENTS

| | | |
|---|---|---|
| 1,908,136 | Fox | May 9, 1933 |
| 2,321,272 | Becwar | June 8, 1943 |
| 2,646,240 | Anderson | July 21, 1953 |
| 2,692,106 | Herrmann | Oct. 19, 1954 |
| 2,727,707 | Wells | Dec. 20, 1955 |